US010482191B2

(12) United States Patent
Shimoyama et al.

(10) Patent No.: US 10,482,191 B2
(45) Date of Patent: Nov. 19, 2019

(54) JIG INFORMATION SETTING METHOD AND JIG INFORMATION SETTING DEVICE

(71) Applicant: HONDA MOTOR CO., LTD., Minato-ku, Tokyo (JP)

(72) Inventors: Masao Shimoyama, Tochigi-ken (JP); Masamitsu Aoto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 15/518,890

(22) PCT Filed: Oct. 8, 2015

(86) PCT No.: PCT/JP2015/078584
§ 371 (c)(1),
(2) Date: Apr. 13, 2017

(87) PCT Pub. No.: WO2016/060054
PCT Pub. Date: Apr. 21, 2016

(65) Prior Publication Data
US 2017/0220705 A1  Aug. 3, 2017

(30) Foreign Application Priority Data
Oct. 15, 2014  (JP) .................. 2014-210503

(51) Int. Cl.
*G06F 17/50* (2006.01)
*B23K 37/04* (2006.01)
*B23K 101/00* (2006.01)

(52) U.S. Cl.
CPC .............. *G06F 17/50* (2013.01); *B23K 37/04* (2013.01); *B23K 2101/006* (2018.08); *G06F 2217/12* (2013.01)

(58) Field of Classification Search
CPC . G06F 17/50; G06F 2217/12; B23K 37/0426; B23K 37/04; B23K 2101/28; B23K 2101/006
See application file for complete search history.

(56) References Cited

U.S. PATENT DOCUMENTS

2008/0009972 A1\* 1/2008 Nihei .................... B25J 9/1669
700/245

FOREIGN PATENT DOCUMENTS

EP        0366069 A2 \*  5/1990  ......... G05B 19/4097
JP      2012-091304 A      5/2012

OTHER PUBLICATIONS

Yogeshkumar K.S., et al., "An Advanced Method of Jigs and Fixtures Planning by Using CAD Methods," Dept. of PG-Studies, Govt. Tool Room and Training centre, Mysore. India, pp. 1-5 (Year: 2014).\*

(Continued)

*Primary Examiner* — Rehana Perveen
*Assistant Examiner* — Steven W Crabb
(74) *Attorney, Agent, or Firm* — Carrier Blackman & Associates, P.C.; Joseph P. Carrier; Jeffrey T. Gedeon

(57) ABSTRACT

On the basis of location information which signifies a clamp location of a jig with respect to a new workpiece, new workpiece cross-section information is recognized in the clamp location. Next, a search is carried out among existing workpiece cross-section information for information similar to the recognized new workpiece cross-section information. Next, jig information is selected which is linked to the found workpiece cross-section information. Next, the selected jig information and the location information are linked and set to new workpiece design information.

4 Claims, 3 Drawing Sheets

(56) References Cited

OTHER PUBLICATIONS

Li, Kailing et al., "Development of an Intelligent Jig and Fixture Design System," School of Mechanical Engineering, Shandong University73, Jingshi Road, Jinan, Shandong, P R China, 250061b pp. 1-5 (Year: 2006).*

International Search Report (PCT/ISA/210) from the International Application PCT/JP2015/078584 along with the English language translation thereof.

* cited by examiner

JIG INFORMATION SETTING METHOD AND JIG INFORMATION SETTING DEVICE

TECHNICAL FIELD

The present invention relates to a jig information setting method and a jig information setting device for setting jig information of a jig for supporting a new workpiece, with respect to design information of the new workpiece for a welding operation.

BACKGROUND ART

In a manufacturing process of a vehicle or the like, a welding gun attached to an arm tip of a robot is moved along a path programmed by teaching to weld workpieces. In the case of welding a new type of workpieces (to be referred to as a new workpiece), various operations such as teaching, determination of the position of a jig for supporting the new workpiece, design of the jig, and the like, are required. Because these operations increase worker-hours, reduction in worker-hours is desired.

One technique for shortening the worker-hours for preparatory operations before welding is disclosed in, for example, Japanese Laid-Open Patent Publication No. 2012-091304. Japanese Laid-Open Patent Publication No. 2012-091304 discloses, as a preparatory operation for welding a new workpiece, automation of a teaching operation and shortening of worker-hours by utilizing teaching information for existing workpieces (referred to as existing workpieces) with partial modification.

SUMMARY OF INVENTION

At present, the automation of the teaching operation has been taken into consideration as disclosed in Japanese Laid-Open Patent Publication No. 2012-091304. On the other hand, automation of a design operation for a jig for supporting a new workpiece has not been taken into consideration. It is still the case that an operator creates design information for a jig to be used for every new workpiece. In this regard, there is still room for reduction in worker-hours.

The present invention has been made, considering such a problem, and an object of the present invention is to provide a jig information setting method and a jig information setting device capable of reducing the number of steps of preparatory operations required before a welding operation.

The present invention provides a jig information setting method of setting jig information of a jig for supporting a new workpiece, with respect to design information of the new workpiece for a welding operation, the method including: a cross-section information recognition step of recognizing new workpiece cross-section information at a clamping position of the jig, based on positional information indicative of the clamping position; and a jig information setting step of retrieving information similar to the new workpiece cross-section information from existing workpiece cross-section information, selecting the jig information associated with the existing workpiece cross-section information retrieved, and setting the selected jig information and the positional information in association with each other to the design information.

Further, in the present invention, the method may further include a positional information setting step of determining the clamping position of the jig, and setting the positional information indicative of the clamping position to the design information, prior to the cross-section information recognition step. If the clamping position of the jig is determined in advance of recognizing the cross-section information, the processing after the recognition of the cross-section information can be performed smoothly.

The present invention provides a jig information setting device for setting jig information of a jig for supporting a new workpiece, with respect to design information of the new workpiece for a welding operation, the jig information setting device including: a cross-section information recognizing unit configured to recognize new workpiece cross-section information at a clamping position of the jig, based on positional information indicative of the clamping position, and a jig information setting unit configured to retrieve information similar to the new workpiece cross-section information from existing workpiece cross-section information, select the jig information associated with the existing workpiece cross-section information retrieved, and set the selected jig information and the positional information in association with each other to the design information.

Further, in the present invention, the device may further include a positional information setting unit configured to determine the clamping position of the jig, and set the positional information indicative of the clamping position to the design information.

The jig information relating to the design of the jig can be roughly determined by the cross-section information of a workpiece at a clamping position, for example, the clamping position, the orientation of the cross section, the shape of the cross section, and the like. Therefore, when setting jig information of a new workpiece, if there is existing cross-section information similar to the cross-section information of the workpiece at the clamping position, the jig information associated with (linked to) the existing cross-section information can be utilized as jig information of the new workpiece. According to the present invention, because existing jig information is utilized to set design information, rather than creating the jig information from scratch, the number of steps of creating jig information can be reduced.

Further, if the clamping position of the jig is determined in advance of recognizing the cross-section information, it is possible to smoothly perform the processing after recognizing the cross-section information.

According to the present invention, it is possible to reduce the number of steps of creating jig information, because existing jig information is utilized to set design information, rather than creating the jig information from scratch.

DESCRIPTION OF EMBODIMENTS

A preferred embodiment of a jig information setting method and a jig information setting device according to the present invention will be described in detail below with reference to the accompanying drawings. In the following description, it is assumed that a new workpiece to be welded and existing workpieces are assemblies for a vehicle body.

[Device Configuration]

Figure 1:
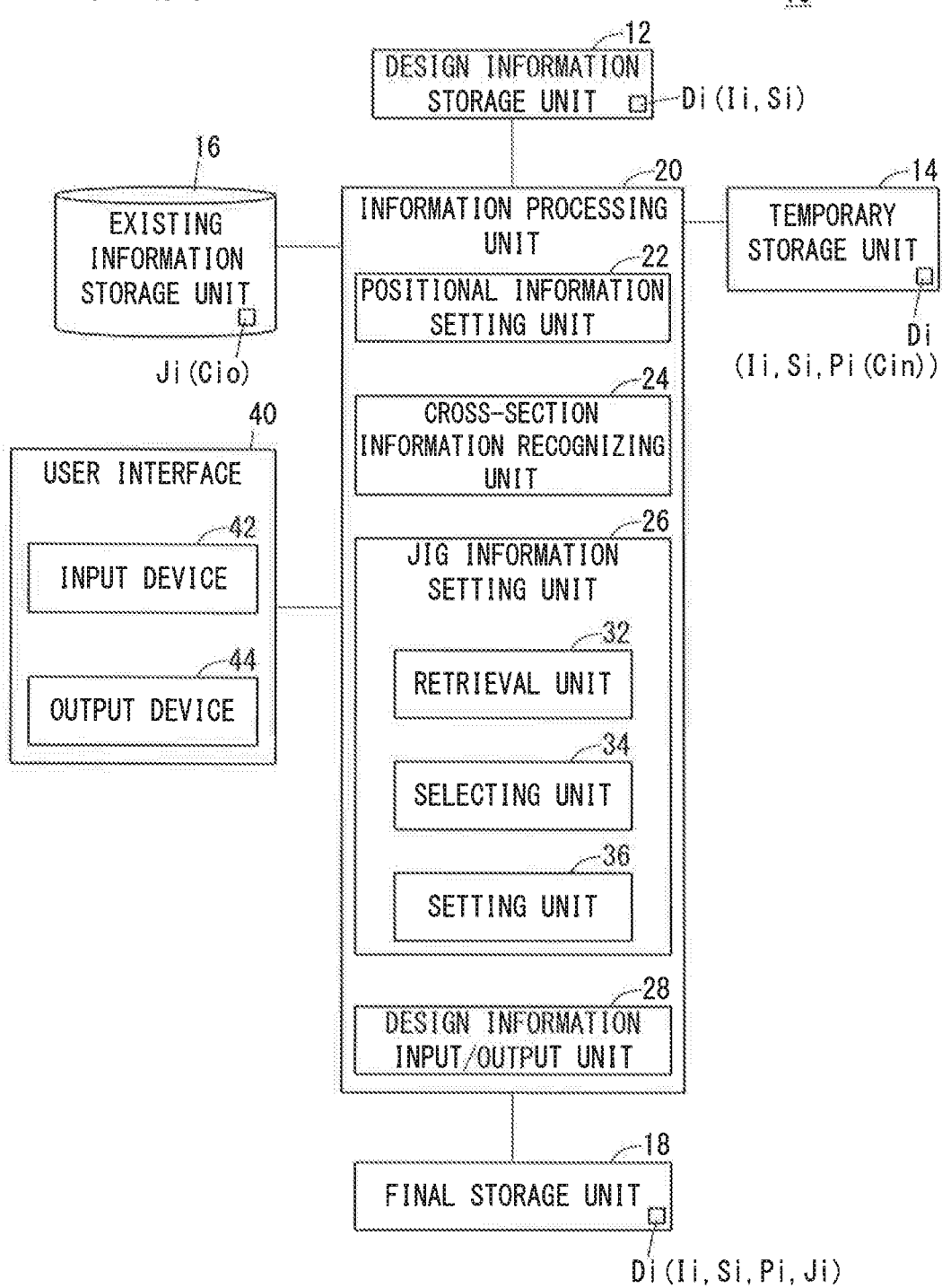
FIG. 1 is a block configuration diagram of a jig information setting device according to the present embodiment.

FIG. 1 is a block configuration diagram of a jig information setting device 10 according to the present embodiment. The jig information setting device 10 includes a design information storage unit 12 that outputs design information Di of a new workpiece (new workpiece design information) to an information processing unit 20, a temporary storage unit 14 that temporarily stores design information Di of the new workpiece processed by the information processing unit 20, an existing information storage unit 16 for storing jig information Ji of existing workpieces, a final storage unit 18 for storing the final design information Di of the new workpiece processed by the information processing unit 20, the information processing unit 20 that performs various types of information processing, and a user interface 40. Any two or all of the design information storage unit 12, the temporary storage unit 14 and the final storage unit 18 may be integrated.

The design information storage unit 12 stores the design information Di of the new workpiece, and outputs the stored design information Di of the new workpiece to the information processing unit 20. The design information Di of the new workpiece to be stored here includes identification information (information of vehicle body category such as light, sedan, minivan, etc., assembly type, and the like) Ii of the new workpiece, and shape information Si of the new workpiece. On the other hand, the design information Di does not include jig positional information Pi or jig information Ji.

The temporary storage unit 14 temporarily stores the design information Di of the new workpiece processed by the information processing unit 20, and also outputs the design information Di of the new workpiece temporarily stored to the information processing unit 20. Here, the design information Di of the new workpiece temporarily stored includes the identification information Ii of the new workpiece, the shape information Si of the new workpiece, and the positional information Pi of the jig, while the jig information Ji is not included.

Figure 2:
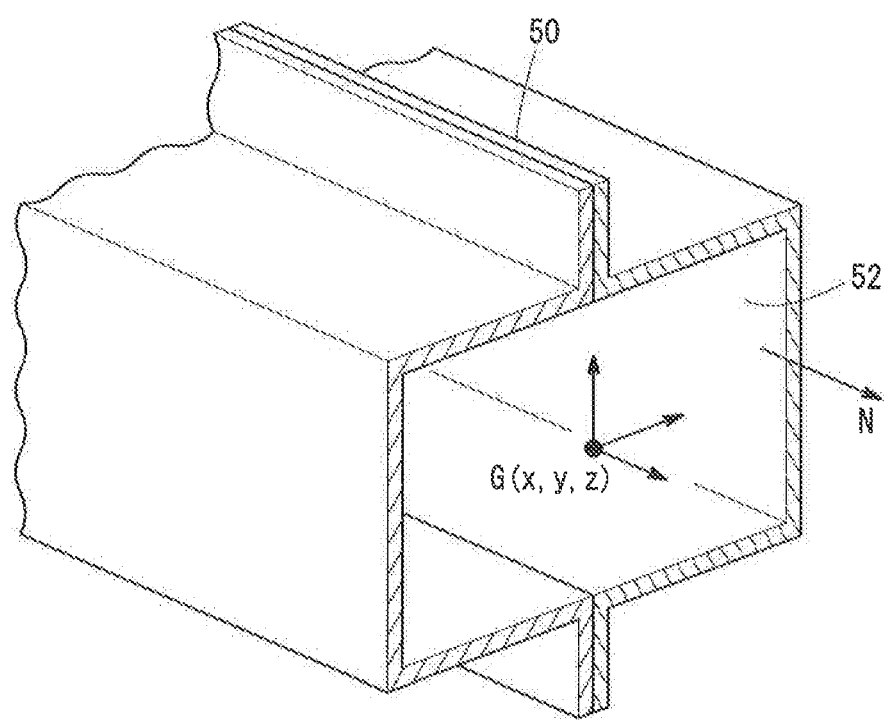
FIG. 2 is a schematic view for explaining cross-section information.

The existing information storage unit 16 is composed, for example, of a database, and stores the jig information Ji of existing workpieces. The jig information Ji of the existing workpieces includes information such as the shape and type of the jig, for example. Each piece of the jig information Ji is associated with cross-section information of an existing workpiece at a position supported by the jig, that is, a clamping position. This cross-section information is referred to as existing workpiece cross-section information Cio. The existing workpiece cross-section information Cio includes, for example, information such as a clamping position, an orientation of the cross section, a shape of the cross section, and the like. For example, as shown in FIG. 2, in the case of a cross section 52 of a workpiece 50, the coordinates (x, y, z) of the center of gravity G of the cross section 52, the normal vector N of the cross section 52, and the shape of the cross section 52 are stored. In addition, each piece of jig information Ji is also associated with identification information Ii of an existing workpiece.

The final storage unit 18 stores the final design information Di of the new workpiece processed by the information processing unit 20. The design information Di of the new workpiece stored here includes the identification information Ii of the new workpiece, the shape information Si of the new workpiece, the positional information Pi of the jig and the jig information Ji.

The information processing unit 20 is a calculator including a computer, and includes: a CPU (Central Processing Unit); a ROM (including EEPROM) and a RAM (Random Access Memory) as memories; and others including an A/D converter, a D/A converter as an input/output device, a timer, and the like. The CPU reads out and executes the program recorded in the ROM so that the information processing unit 20 functions as various operation realizing units, more specifically, as a positional information setting unit 22, a cross-section information recognizing unit 24, a jig information setting unit 26, and a design information input/output unit 28, as shown in FIG. 1.

The positional information setting unit 22 inputs the design information Di of the new workpiece from the design information storage unit 12, performs a predetermined information processing, and outputs design information Di of the new workpiece after processing to the temporary storage unit 14. The positional information setting unit 22 determines a portion of the new workpiece to be supported by the jig, and sets positional information Pi indicating the position of the portion, that is, the clamping position, to the design information Di of the new workpiece.

Based on the shape information Si of the new workpiece and the positional information Pi set by the positional information setting unit 22, the cross-section information recognizing unit 24 recognizes the cross-section information of the new workpiece at the clamping position indicated by the positional information Pi. The cross-section information thus obtained is the new workpiece cross-section information Cin. As is the case of the existing workpiece cross-section information Cio, the new workpiece cross-section information Cin also includes information such as the clamping position, the orientation of the cross section, the shape of the cross section, and the like.

The jig information setting unit 26 includes a retrieval unit 32, a selecting unit 34 and a setting unit 36. The retrieval unit 32 retrieves information similar to the new workpiece cross-section information Cin recognized by the cross-section information recognizing unit 24 from the existing workpiece cross-section information Cio in the existing information storage unit 16. The selecting unit 34 selects the jig information Ji associated with the existing workpiece cross-section information Cio retrieved by the retrieval unit 32. The setting unit 36 sets the jig information Ji selected by the selecting unit 34 to the design information Di of the new workpiece. At this time, the jig information Ji is associated with the positional information Pi set by the positional information setting unit 22.

The design information input/output unit 28 inputs the design information Di of the new workpiece from the design information storage unit 12 and from the temporary storage unit 14, so that it can be processed by the information processing unit 20. Also, the design information input/output unit 28 outputs the design information Di of the new workpiece processed by the information processing unit 20 to the temporary storage unit 14 and to the final storage unit 18.

The user interface 40 is composed of, for example, a personal computer. The user interface 40 includes an input device 42 such as a mouse, a keyboard, and the like, and an output device 44 such as a display, a speaker, a printer, and the like. The user interface 40 outputs inputted information corresponding to an input operation performed on the input device 42 to the information processing unit 20, and provides various information outputted from the information processing unit 20 to an operator through the output device 44.

[Operation]

Figure 3:
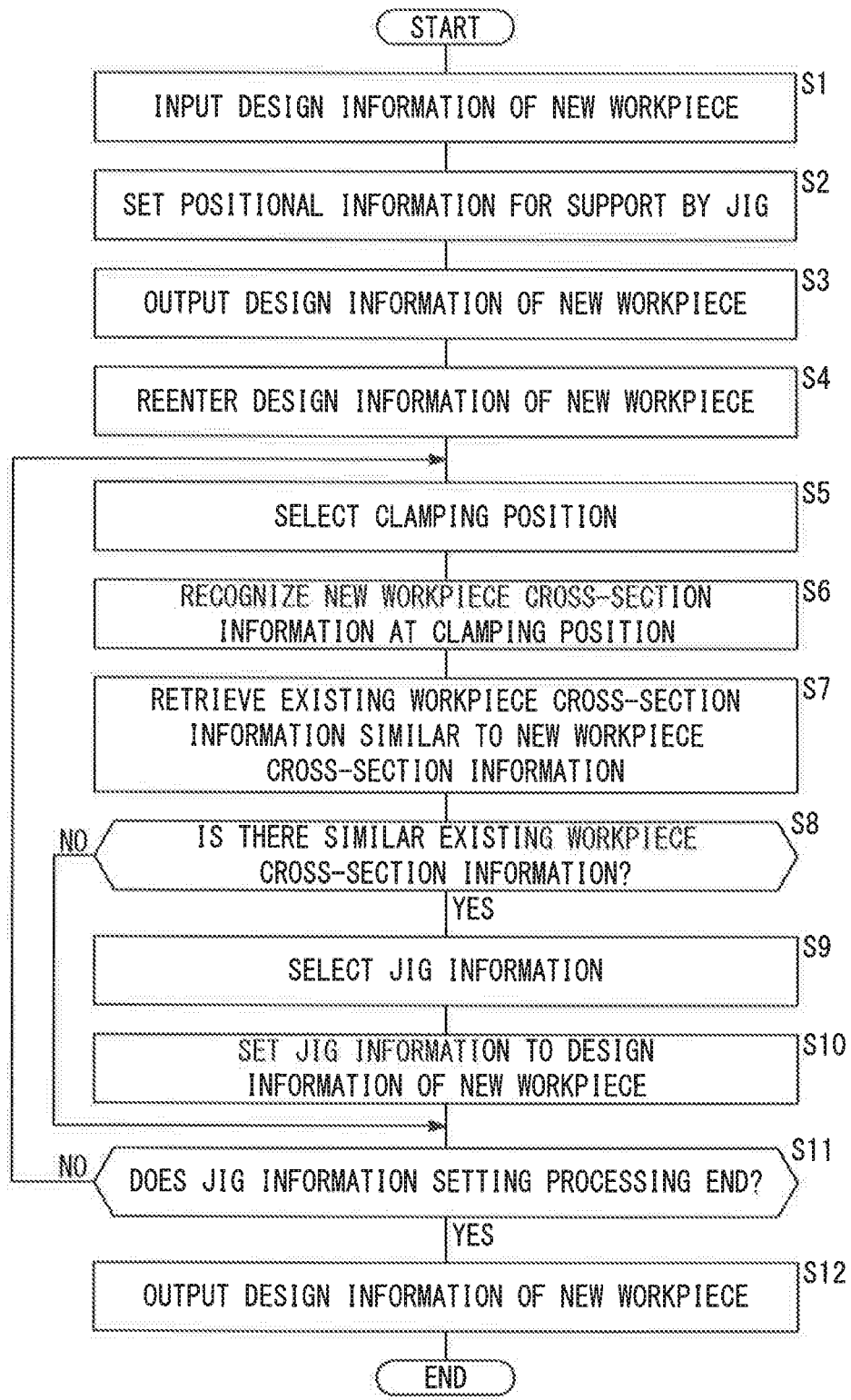
FIG. 3 is a flowchart for explaining operation of the jig information setting device according to the present embodiment.

FIG. 3 is a flowchart for explaining an operation of the jig information setting device according to the present embodiment. The following process is performed in a three-dimensional virtual space, and the procedure of the processing is displayed on the output device 44 of the user interface 40.

In step S1, when the operator operates the input device 42 of the user interface 40 to start the processing, the design information input/output unit 28 inputs the design information Di of the new workpiece from the design information storage unit 12.

In step S2, the positional information setting unit 22 performs simulation using the design information Di of the new workpiece inputted by the design information input/output unit 28, and determines the clamping position of the jig within the new workpiece. Then, the positional information Pi indicating the clamping position is set to the design information Di of the new workpiece, for example, by the following simulation.

At First, a plurality of clamping positions (1) to (m) to be used as references are determined within a new workpiece. The plurality of clamping positions (1) to (m) are the fewest number of clamping positions which can achieve stable holding of the new workpiece. The positional information Pi (1) to Pi (m) indicating the determined clamping positions (1) to (m) are set to the design information Di of the new workpiece.

Next, with respect to the new workpiece supported at the clamping positions (1) to (m), a portion of the new workpiece where the amount of deflection exceeds a predetermined value is determined. The position of the portion determined is set as the clamping position (m+1) to the design information Di of the new workpiece. Next, with respect to the new workpiece supported at the clamping positions (1) to (m+1), a portion of the new workpiece where the amount of deflection exceeds a predetermined value is determined. The position of the portion determined is set as the clamping position (m+2) to the design information Di of the new workpiece. The above process is repeated until the deflection amount does not exceed the predetermined value at any portions of the new workpiece.

With the deflection amount exceeding the predetermined value at no portion, the number of the portions set for the jig is n. The pieces of positional information Pi (1) to Pi (n) respectively indicating the determined clamping positions (1) to (n) are set to the design information Di of the new workpiece. In step S3, the design information input/output unit 28 outputs the design information Di of the new workpiece, to which the positional information Pi (1) to Pi (n) is set, to the temporary storage unit 14.

In step S4, in response to the start operation for the jig information setting process via the input device 42, the design information input/output unit 28 inputs again the new workpiece design information Di from the temporary storage unit 14. Further, in step S5, upon selection of any one of the clamping positions (1) to (n) set to the design information Di of the new workpiece, the information processing unit 20 performs the following steps S6 to S10 with respect to the selected clamping position. The selection of the clamping position may be made by an operation of a program or may be done by a selection operation via the input device 42.

In step S6, the cross-section information recognizing unit 24 recognizes new workpiece cross-section information Cin at the clamping position. At this time, the cross-section information recognizing unit 24 recognizes the new workpiece cross-section information Cin at the clamping position indicated by the positional information Pi, based on the shape information Si and the positional information Pi of the new workpiece set to the design information Di of the new workpiece.

In step S7, the retrieval unit 32 retrieves information similar to the new workpiece cross-section information Cin from the existing workpiece cross-section information Cio stored in the existing information storage unit 16. When the coordinates (x, y, z) of the center of gravity G of the cross section 52, the normal vector N of the cross section 52, and the shape of the cross section 52, as shown in FIG. 2, are included as the respective cross-section information Cin, Cio, the retrieval unit 32 judges the similarity of the coordinates, normal vector, and cross-sectional shape based on a predetermined judgment criterion.

In step S8, if there is no existing workpiece cross-section information Cio similar to the new workpiece cross-section information Cin in the existing information storage unit 16 (step S8: NO), the flow goes to step S11 to be described later. On the other hand, if there is existing workpiece cross-section information Cio similar to the new workpiece cross-section information Cin in the existing information storage unit 16 (step S8: YES), the flow goes to the next step S9.

In step S9, the selecting unit 34 selects the jig information Ji associated with the existing workpiece cross-section information Cio retrieved by the retrieval unit 32 in step S7.

In step S10, the setting unit 36 sets the jig information Ji selected by the selecting unit 34 in step S9, as the jig information Ji, to the design information Di of the new workpiece. At this time, the setting unit 36 associates the jig information Ji with the positional information Pi.

In step S11, if the jig information setting process is to be continued (step S11: NO), the flow goes back to step S5 and repeats the information setting process (steps S5 to S10) for another clamping position. On the other hand, if the jig information setting process is over (step S11: YES), the process proceeds to step S12. In step S12, the design information input/output unit 28 outputs the design information Di of the new workpiece, to which the positional information Pi (1) to Pi (n) and the jig information Ji (1) to Ji(n) are set, to the final storage unit 18.

Summary of Present Embodiment

The jig information setting method according to the present embodiment sets jig information Ji of a jig for supporting a new workpiece, with respect to design information Di of the new workpiece for a welding operation. The jig information setting method according to the present embodiment includes a cross-section information recognition step (step S6) of recognizing new workpiece cross-section information Cin at a clamping position of the jig, based on positional information Pi indicative of the clamping position. The method also includes a jig information setting step of: retrieving information similar to the new workpiece cross-section information Cin from the existing workpiece cross-section information Cio (step S7); selecting the jig information Ji associated with the retrieved existing workpiece cross-section information Cio (step S9); and setting the selected jig information Ji and the positional information Pi in association with each other to the design information Di of the new workpiece (step S10).

Further, in the jig information setting method according to the present embodiment, prior to the cross-section information recognition step (step S6), a positional information setting step (step S2) of determining the clamping position of the jig, and setting the positional information Pi indicative of the clamping position to the design information Di of the new workpiece is performed.

The jig information setting device 10 according to the present embodiment sets jig information Ji of a jig for supporting a new workpiece, with respect to design information Di of the new workpiece for a welding operation. The jig information setting device 10 according to the present embodiment includes a cross-section information recognizing unit 24 that recognizes new workpiece cross-section information Cin at a clamping position of the jig, based on positional information Pi indicative of the clamping position. The jig information setting device 10 according to the present embodiment also includes a jig information setting unit 26 that retrieves information similar to new workpiece cross-section information Cin from existing workpiece cross-section information Cio, selects the jig information Ji associated with the retrieved existing workpiece cross-section information Cio, and sets the selected jig information Ji and the positional information Pi in association with each other to the design information Di of the new workpiece.

The jig information setting device 10 according to the present embodiment further includes a positional information setting unit 22 that determines the clamping position of the jig and sets the positional information Pi indicative of the clamping position to the design information Di of the new workpiece.

The jig information Ji related to the design of the jig is roughly determined by the cross-section information (new workpiece cross-section information Cin) of the workpiece at the clamping position, for example, the clamping position, the orientation of the cross section, the shape of the cross section, and the like. Therefore, when setting the jig information Ji of the new workpiece, if there is existing cross-section information (existing workpiece cross-section information Cio) similar to the cross-section information of the workpiece at the clamping position (new workpiece cross-section information Cin), jig information Ji associated with (or linked to) the existing cross-section information can be used as jig information Ji of the new workpiece. According to the present embodiment, since the jig information Ji is not created from scratch but the existing jig information Ji is utilized to set the design information Di of the new workpiece, the worker-hours for preparing the jig information Ji can be saved.

The present invention is not limited to the above-described embodiment, but various configurations can be adopted without departing from the scope of the present invention. For example, the workpiece is not limited to those for vehicle bodies. The present embodiment can be applied to any jig as long as it is a jig for supporting a workpiece.

Further, at the time of retrieval at step S7 shown in FIG. 3, the identification information Ii of the new workpiece may be used as a criterion for similarity judgment.

In addition, instead of performing the jig information setting process on the clamping position selected in step S5 shown in FIG. 3, the jig information setting process may be sequentially performed automatically for all of the clamping positions (1) to (n).

Further, in step S2 shown in FIG. 3, a simulation may be performed assuming a state in which reinforcing members are mounted on a new workpiece (vehicle body) at several points, and a portion to be supported by the jig may be determined for such a new workpiece.

The invention claimed is:

1. A jig information setting method of setting jig information of a jig for supporting a new workpiece, with respect to design information of the new workpiece for a welding operation, the method performed by a processor, comprising:
    a cross-section information recognition step of recognizing new workpiece cross-section information at a clamping position of the jig, based on positional information indicative of the clamping position; and
    a jig information setting step of retrieving information similar to the new workpiece cross-section information from existing workpiece cross-section information, selecting the jig information associated with the existing workpiece cross-section information retrieved, and setting the selected jig information and the positional information in association with each other to the design information,
    wherein the new workpiece cross-section information contains information about coordinates of a center of gravity of a cross section of the new workpiece, information about a normal vector of the cross section of the new workpiece, and information about a shape of the cross section of the new workpiece,
    wherein the existing workpiece cross-section information contains information about coordinates of a center of gravity of a cross section of the existing workpiece, information about a normal vector of the cross section of the existing workpiece, and information about a shape of the cross section of the existing workpiece, and
    wherein the clamping position is one of a plurality of clamping positions 1-n and wherein the processor is configured to perform the cross-section information recognition and the information setting steps sequentially for each of the clamping positions 1-n.

2. The jig information setting method according to claim 1, further comprising a step performed by the processor a positional information setting step of determining the clamping position of the jig, and setting the positional information indicative of the clamping position to the design information, prior to the cross-section information recognition step.

3. A jig information setting device for setting jig information of a jig for supporting a new workpiece, with respect to design information of the new workpiece for a welding operation, the jig information setting device comprising a processor configured to perform:
    a recognition step of recognizing new workpiece cross-section information at a clamping position of the jig, based on positional information indicative of the clamping position; and
    a jig information setting step of retrieving information similar to the new workpiece cross-section information from existing workpiece cross-section information, selecting the jig information associated with the existing workpiece cross-section information retrieved, and setting the selected jig information and the positional information in association with each other to the design information,
    wherein the new workpiece cross-section information contains information about coordinates of a center of gravity of a cross section of the new workpiece, information about a normal vector of the cross section of the new workpiece, and information about a shape of the cross section of the new workpiece, and
    wherein the existing workpiece cross-section information contains information about coordinates of a center of gravity of a cross section of the existing workpiece, information about a normal vector of the cross section of the existing workpiece, and information about a shape of the cross section of the existing workpiece, and wherein the clamping position is one of a plurality of clamping positions 1-n and wherein the processor is further configured to perform the recognition and retrieval steps sequentially for each of the clamping positions 1-n.

4. The jig information setting device according to claim 3, wherein the processor is further configured to function as a positional information setting unit configured to determine the clamping position of the jig and set the positional information indicative of the clamping position to the design information.

* * * * *